(12) United States Patent
Johansson et al.

(10) Patent No.: US 9,432,253 B1
(45) Date of Patent: Aug. 30, 2016

(54) AUTOMATED MULTI-USER SYSTEM DETECTION

(75) Inventors: Jesper M. Johansson, Redmond, WA (US); Robert Hanson, Seattle, WA (US); Daniel W. Hitchcock, Bothell, WA (US); Darren E. Canavor, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 744 days.

(21) Appl. No.: 13/303,427

(22) Filed: Nov. 23, 2011

(51) Int. Cl.
*G06F 15/173* (2006.01)
*H04L 12/24* (2006.01)

(52) U.S. Cl.
CPC .................................... *H04L 41/08* (2013.01)

(58) Field of Classification Search
CPC ............. H04L 1/0048; H04L 29/0809; H04L 29/08594; H04L 49/355; H04L 67/02; H04L 5/005; H04L 5/00
USPC ......... 709/226; 707/748; 370/319, 310, 252, 370/270
See application file for complete search history.

(56) References Cited

U.S. PATENT DOCUMENTS

| | | | |
|---|---|---|---|
| 7,346,552 B1* | 3/2008 | Salzinger et al. | 705/26.43 |
| 7,533,064 B1* | 5/2009 | Boesch | G06Q 20/04 705/26.1 |
| 7,761,558 B1* | 7/2010 | Jindal | H04L 67/303 709/223 |
| 8,065,698 B2* | 11/2011 | Glasgow et al. | 725/10 |
| 8,125,459 B2* | 2/2012 | Mattice et al. | 345/173 |
| 2003/0187928 A1* | 10/2003 | MacLeod et al. | 709/204 |
| 2004/0003087 A1* | 1/2004 | Chambliss et al. | 709/226 |
| 2004/0193313 A1* | 9/2004 | Cornet et al. | 700/231 |
| 2004/0234007 A1* | 11/2004 | Mills | 375/340 |
| 2005/0010572 A1* | 1/2005 | Clark et al. | 707/10 |
| 2006/0129627 A1* | 6/2006 | Phillips et al. | 709/200 |
| 2008/0288408 A1* | 11/2008 | Jacobsen | 705/50 |
| 2009/0157593 A1* | 6/2009 | Hayashi et al. | 707/1 |
| 2010/0278219 A1* | 11/2010 | Yu et al. | 375/148 |
| 2010/0332648 A1* | 12/2010 | Bohus et al. | 709/224 |
| 2011/0072355 A1* | 3/2011 | Carter et al. | 715/738 |
| 2011/0179158 A1* | 7/2011 | Donnelly et al. | 709/224 |
| 2011/0212783 A1* | 9/2011 | Dale et al. | 463/42 |
| 2011/0219419 A1* | 9/2011 | Reisman | 725/112 |

* cited by examiner

*Primary Examiner* — Mohamed Wasel
*Assistant Examiner* — Tsung Wu
(74) *Attorney, Agent, or Firm* — Thomas | Horstemeyer, LLP (57) ABSTRACT

Disclosed are various embodiments for automated detection of multi-user computing devices such as kiosks, public terminals, and so on. Network resource requests are obtained from a client computing device. It is determined whether the client computing device is a multi-user system based at least in part on whether the network resource requests embody characteristics associated with multi-user systems. The resulting classification is stored and may be used to customize generation of requested network resources.

27 Claims, 7 Drawing Sheets

AUTOMATED MULTI-USER SYSTEM DETECTION

BACKGROUND

Users may access network resources, such as network sites, by way of their own office workstations, home desktops and laptops, smartphones, tablets, and so on. Sometimes users may access network resources by way of a multi-user computing device. Non-limiting examples of such multi-user computing devices include public terminals, general-purpose Internet kiosks, limited-purpose kiosks, and so on. Such multi-user computing devices may be located in public libraries, airports, coffee shops, restaurants, shopping malls, and other locations.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to multi-user system detection. It may be desirable for various reasons to detect whether a client computing device is a multi-user system. As used herein, "multi-user system" corresponds to a computing device where multiple users are identified by a network site using the same browser session or configuration. The multiple users may be using the same operating system login session. Kiosks and/or other multi-user systems may pose security and privacy risks that are not present on single-user systems. Consequently, a network site may wish to disable, or not enable, certain functionality when a user accesses the network site by way of a multi-user system. Although users are likely aware whether they are using multi-user systems, asking the users to identify their clients as multi-user or non-multi-user may be unreliable and/or may be a hassle for the users.

Various embodiments of the present disclosure provide automated approaches to multi-user system detection. The present disclosure discusses a variety of characteristics that may indicate whether a client device is a multi-user system or a non-multi-user system. These characteristics may be evaluated for a given client device to generate one or more confidence scores relating to whether the client device is a multi-user system or a non-multi-user system. The client device may be classified as a multi-user system or a non-multi-user system depending at least in part on the confidence scores. The classification may be used to customize the generation of network resources. In the following discussion, a general description of the system and its components is provided, followed by a discussion of the operation of the same.

Figure 1:
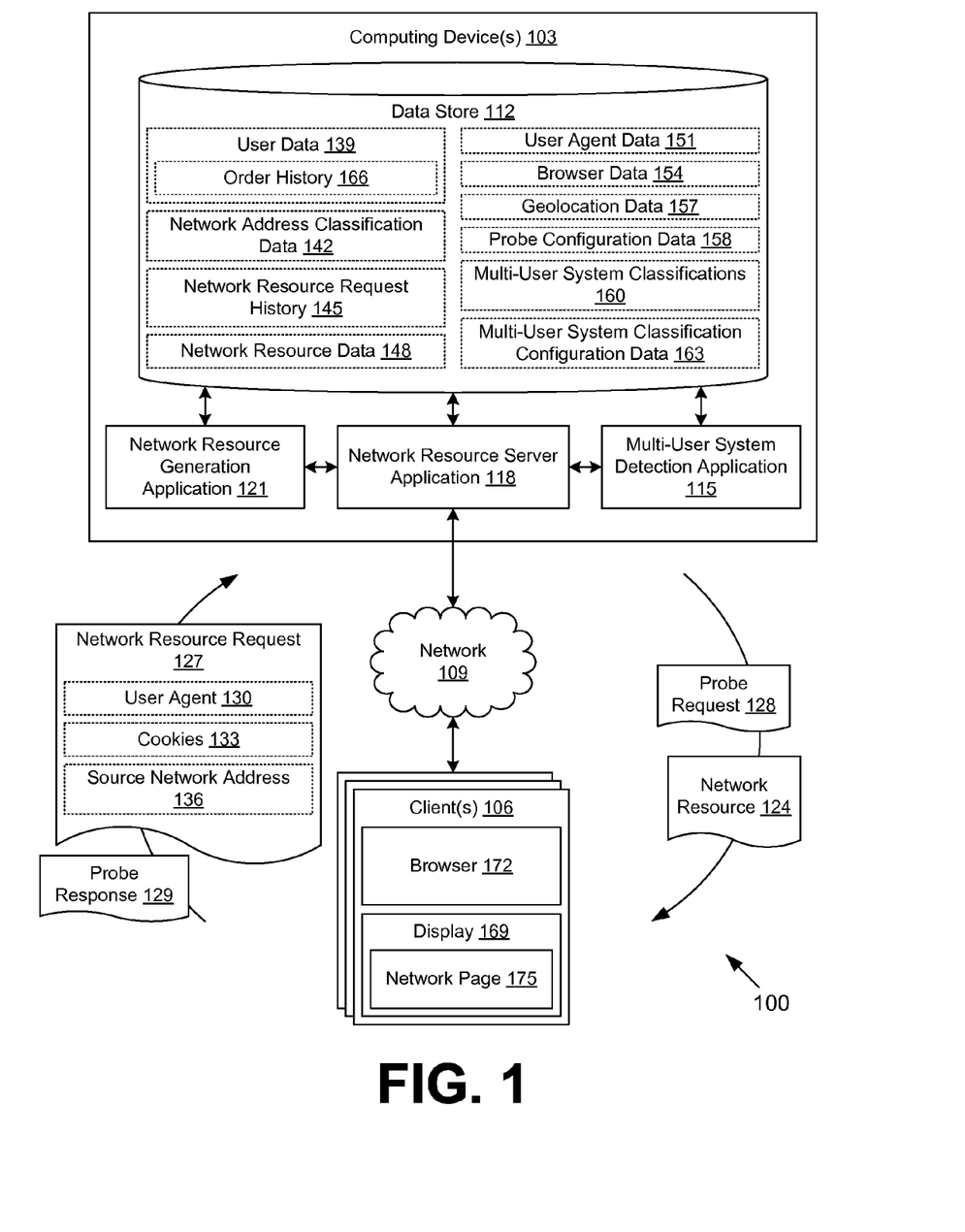
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a multi-user system detection application 115, a network resource server application 118, a network resource generation application 121, and other applications, services, processes, systems, engines, or functionality not discussed in detail herein. The multi-user system detection application 115 is executed to determine whether a given client 106 is a multi-user system. To this end, if sufficient data is available, the multi-user system detection application 115 may classify a client 106 as a multi-user system or a non-multi-user system based at least in part on one or more confidence scores. The multi-user system detection application 115 generates the confidence scores by evaluating whether the client 106 embodies various characteristics associated with multi-user systems or non-multi-user systems.

The network resource server application 118 is configured to serve up network resources 124 such as, for example, network pages and/or other forms of network content, in response to network resource requests 127. The network resource server application 118 may also be configured to issue probe requests 128 to the client 106 and to receive probe responses 129 from the client 106. The network pages may correspond to web pages, gopher pages, mobile application screens, Flash content, and/or other forms of network content. In various embodiments, the network resource server application 118 may correspond to a commercially available hypertext transfer protocol (HTTP) server such as, for example, Apache® HTTP Server, Apache® Tomcat®, Microsoft® Internet Information Services (IIS), and so on. The network resource generation application 121 is configured to generate the network resources 124. Such network resources 124 may be statically read from a data store 112 or dynamically generated.

In one embodiment, a network resource request 127 corresponds to an HTTP request. The network resource request 127 may include various data such as a user agent 130, one or more cookies 133, a source network address 136, and/or other data. The user agent 130 may be a string which identifies one or more software applications executed by the client 106, such as, for example, a browser application, a browser plug-in, an operating system, etc. Such user agent 130 string may indicate particular versions of software applications and may be customized. The cookies 133 correspond to data identifiers set by a network resource server application 118 which may be read back only by network resource server applications 118 within the same domain or a subdomain thereof. The cookies 133 may include persistent browser identifiers, session identifiers, user identifiers, machine identifiers, Flash cookies, and so on. The source network address 136 may correspond to an internet protocol (IP) address or any other address which may be used to identify the client 106 on the network 109.

The data stored in the data store 112 includes, for example, user data 139, network address classification data 142, network resource request history 145, network resource data 148, user agent data 151, browser data 154, geolocation data 157, probe configuration data 158, multi-user system classifications 160, multi-user system classification configuration data 163, and potentially other data. The user data 139 corresponds to any data that may be associated with users of a network site. The user data 139 may pertain to registered users with accounts or users who are unregistered. The user data 139 may, for example, include various identifiers, usernames, passwords, etc. to aid in identification or authentication of the user when the user accesses the network site. In one embodiment, the user data 139 may include an order history 166 for the user, which includes data relating to previous orders placed by the user through an electronic commerce system of the network site.

The network address classification data 142 may include various data used by the multi-user system detection application 115 to identify static network addresses or dynamic network addresses. A static network address is a network address that generally does not change over time. By contrast, a dynamic network address is a network address that may change periodically, every time a client 106 is restarted, or at another time. The network address classification data 142 may include data to enable identification of source network addresses 136 that are registered to certain network 109 access providers. The network address classification data 142 may also include data to enable identification of source network addresses 136 which are behind one or more network address translation devices on the network 109. Various portions of the network address classification data 142 may be obtained from a third party such as the American Registry for Internet Numbers (ARIN), Réseaux IP Européens (RIPE), or another regional Internet registry or data source.

The network resource request history 145 may include data extracted or generated from network resource requests 127 previously received from a client 106. The network resource data 148 includes data employed by the network resource generation application 121 to generate network resources 124. To this end, the network resource data 148 may include, for example, text, hypertext markup language (HTML), extensible markup language (XML), cascading style sheets (CSS), extensible style sheet language transformations (XSLT), code, templates, images, videos, audio, animations, and/or other data.

The user agent data 151 may include data that facilitates identification of various browser applications, operating systems, etc. based on the user agent 130 of the network resource request 127. The browser data 154 may include data that facilitates identification of clients 106 by way of browser sessions or unique identifiers. For example, a persistent cookie 133 may be established in the client 106 to uniquely identify the particular browser regardless of whether a user is logged in to the network site or otherwise is identified by the network site. The geolocation data 157 corresponds to data that facilitates identification of a location from the source network address 136. In some embodiments, the geolocation data 157 may be provided by a network service. The probe configuration data 158 includes data used to configure probing operations directed at the client 106. Such probing operations may involve probe requests 128 issued by the computing device 103 and probe responses 129 returned by the client 106. Such probing operations may relate, for example, to determining whether the client 106 uses a content filter, determining whether the client 106 employs a particular browser, operating system, or other software configuration, and/or other probing operations.

The multi-user system classifications 160 correspond to classifications of particular clients 106 that have been completed or are in progress. The multi-user system classifications 160 may classify a client 106 as being a multi-user system or a non-multi-user system. The multi-user system classifications 160 may include confidence scores relating to classifications that are in progress. The multi-user system classification configuration data 163 includes various parameters that control the operation of the multi-user system detection application 115. For example, the multi-user system classification configuration data 163 may include parameters that control which multi-user or non-multi-user characteristics are evaluated, how the characteristics are weighted in computing confidence scores, confidence score thresholds for classification, and so on.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, kiosks, or other devices with like capability. The client 106 may include a display 169. The display 169 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 172 and/or other applications. The browser 172 may be executed in a client 106, for example, to access and render network pages, such as web pages, or other network content served up by the computing device 103 and/or other servers, thereby rendering a network page 175 on the display 169. In various embodiments where the client 106 is a multi-user system, the browser 172 may be customized by a supplier or operator of the client 106. The client 106 may be configured to execute applications beyond the browser 172 such as, for example, mobile applications, email applications, instant message applications, and/or other applications.

Next, a general description of the operation of the various components of the networked environment 100 is provided. To begin, a user at a client 106 uses a browser 172 to request a network resource 124 from a network site hosted by the computing device 103. A network resource request 127 is thereby generated and sent to the network resource server application 118 by way of the network 109. The network resource server application 118 may identify the client 106 based at least in part on the network resource request 127. For example, the network resource request 127 may include a persistent browser cookie 133 which can be correlated with a unique browser identifier in the browser data 154.

The network resource server application 118 may determine whether the client 106 is classified as a multi-user system or a non-multi-user system by referring to stored classifications in the multi-user system classifications 160. The network resource server application 118 causes the generation of the network resource 124 through the network resource generation application 121. The network resource 124 may be customized based at least in part on a classification of the client 106 as being either a multi-user system or a non-multi-user system. For example, a network resource 124 such as a network page 175 may omit some feature or content if the client 106 is determined to be a multi-user system, determined to be a non-multi-user system, not determined to be a multi-user system, or not determined to be a non-multi-user system. Conversely, the network resource 124 may include some feature or content if the client 106 is determined to be a multi-user system, determined to be a non-multi-user system, not determined to be a multi-user system, or not determined to be a non-multi-user system. The generated network resource 124 is then returned to the client 106 over the network 109.

The multi-user system detection application 115 may be executed at a time irrespective of the network resource request 127 or as a part of fulfilling the network resource request 127. If executed as part of fulfilling the network resource request 127, the multi-user system detection application 115 may be executed in a blocking or non-blocking fashion with respect to fulfillment of the network resource request 127. The multi-user system detection application 115 may evaluate the network resource request 127 and/or the network resource request history 145 for the client 106 to determine whether the client 106 should be classified as a multi-user system or a non-multi-user system.

To this end, the multi-user system detection application 115 may determine whether the network resource request 127 and/or the network resource request history 145 embody certain characteristics of a multi-user system or a non-multi-user system. It may be the case that none of the characteristics are individually determinative, and some characteristics may be more important than others. Thus, a confidence score may be computed, with differing weights being applied to characteristics according to a predetermined respective importance. Various non-limiting examples of characteristics will now be described.

To begin, a multi-user system may be characterized by many different users logging in through the same browser 172. To the extent that a network resource request history 145 which is correlated to a browser 172 or client 106 shows many different unique users, the client 106 may be a multi-user system. Browser identifiers and/or user identifiers in the cookies 133 may be consulted to determine clients 106 and users, respectively. For evaluation of this characteristic, predefined thresholds may be established for quantities of unique users over a time frame. The contribution of this characteristic to the confidence score may depend at least in part on the quantity of unique users. It may be important to establish thresholds to discriminate between a true multi-user system and a non-multi-user system having an owner who has allowed others to temporarily use it. One or more heuristics may be employed to examine, for example, the last name of the users and/or other data, to avoid classifying a home system as a multi-user system.

In addition, a multi-user system may be characterized by few repeat sessions by users over time. Some multi-user systems, such as walk-up kiosks in airports, may have few if any repeat sessions of users. In some cases, a multi-user system may have some repeat user sessions. For example, a multi-user system in a hotel where a user may stay for a week may exhibit repeat user sessions. Therefore, a threshold time period (e.g., a week, a month, a year, etc.) may be defined in order to account for multi-user systems that may see repeat use within a time frame. Whether user sessions are interleaved within a time period may be a factor as well. Even if a user logs in through a client 106 many times during a week, if many other users also log in through the same client 106 during the week, the client 106 is likely to be a multi-user system.

The user agent 130 field of the network resource request 127 may also be used to identify multi-user systems. The user agent 130 typically identifies the browser 172, the particular version of the browser 172, the operating system, the version of the operating system, browser 172 platform details, and/or other information. A kiosk or other type of multi-user system may have a special or uncommon user agent 130 string. As a non-limiting example, a kiosk manufacturer may configure the browser 172 to insert "Kiosk-Name" in the user agent 130 string. Accordingly, if this is known, "KioskName" may be stored in the user agent data 151 and may be highly determinative of a multi-user system. Even if "KioskName" is not known, it would be a relatively infrequently occurring value in the user agent 130 across the universe of clients 106, which would weigh towards a multi-user system classification.

Furthermore, less popular browsers 172, versions of browsers 172, operating systems, operating system versions, or other particular versions of software applications may be associated with multi-user systems. In contrast to home and office clients 106 which may have frequently updated software, kiosks and other multi-user systems may be infrequently updated. The manufacturer may roll out a particular configuration which is secured for public use and may seldom update it. Users often have the latest version of software on their own clients 106 due to automatic updating mechanisms. Such automatic updating mechanisms may be disabled on multi-user systems due to security, stability, and/or other concerns. Also, unpopular operating systems may be employed by multi-user systems for customization, cost, security, and/or other reasons. Consequently, the use of unpopular, out-of-date, or otherwise infrequently occurring software applications may contribute toward a multi-user system determination.

In some cases, a particular configuration of browser 172 software and plug-ins may be fingerprinted and correlated with particular known multi-user systems. Although the user agent 130 may be a source of some information regarding the browser 172 configuration, a network resource 124 served up to the client 106 may include code that gathers additional information about what plug-ins and capabilities are available and/or other detectable characteristics. Such information may be reported back to the computing device 103 for further evaluation by the multi-user system detection application 115 in comparison to known fingerprints of multi-user systems. As a non-limiting example, a particular version of a browser 172 used in kiosks may be customized such that the Flash plug-in cannot be installed. Thus, if it is determined that the Flash plug-in is not installed, the client 106 may be a multi-user system. As another non-limiting example, a browser 172 may be customized to use only a temporary profile and not persist cookies 133 across sessions, and this may indicate a multi-user system. As yet another example, the multi-user system may have a user login name including the string "kiosk" or something else that may be a detectable characteristic of multi-user systems.

Geolocation of source network addresses 136 may be used to identify multi-user systems. For example, a network site with an electronic commerce system may have an order history 166 for its users. The order history 166 may include shipping addresses for various orders. If the shipping addresses for users who have logged in through the client 106 rarely coincide with a location of the source network address 136 for the client 106, the client 106 may likely be a multi-user system. That is to say, multi-user systems are likely to be deployed in airports, libraries, shopping malls, and other locations with high user traffic, yet the users of the systems may be highly unlikely to have an order shipped to the airport, library, shopping mall, etc. In contrast, single-user machines may be likely to have orders shipped to their location.

Several caveats may exist with respect to this location-based characteristic. First, the location based on the source network address 136 and the geolocation data 157 may have limited accuracy because it is related to network topology. For example, a client 106 may be connected to the network 109 by way of equipment that is a mile away. The location as determined through geolocation may pertain to the network equipment rather than the client 106. Thus, a radius or zone may be employed to evaluate the coincidence of the location with shipping addresses, which may limit the accuracy of this characterization. Second, a client 106 may be a smartphone or other mobile device and orders may be placed while traveling away from the shipping address. Third, a user of a single-user office workstation might always have orders shipped to a home address rather than the office address. However, if a particular browser 172 and client 106 are associated with repeated placement of orders having a particular shipping address different from the location of the client 106, the client 106 may be classified as a single-user system by virtue of having few or no different users being identified through the client 106.

Source network addresses 136 which are observed to be static in the network resource request history 145 for a client 106 may be more likely to be multi-user systems because multi-user systems are more likely to have static network addresses. Additionally, home and office systems are likely to be behind network address translation systems which give many clients 106 the same source network address 136. It may be the case that certain types of multi-user clients 106 are unlikely to be behind a network address translation system. In some cases, certain source network address 136 ranges may be known to be associated with or controlled by operators of multi-user systems. The multi-user system detection application 115 may evaluate these characteristics using the network address classification data 142 and the network resource request history 145.

Multi-user systems, such as those located at public places, may be more likely to have content filtering software installed. In some cases, whether a client 106 is subject to filtering software may be identified from the user agent 130. In other cases, the presence of filtering software may be identified by way of probing. For example, a network resource 124 with content that is likely to be subject to exclusion by the filtering software may be served up by the network resource server application 118. If the network resource 124 is not rendered by the browser 172, code executed in the client 106 in conjunction with a network page 175 may report back the existence of filtering software. Other approaches may be used to ascertain the presence of filtering software. The presence of filtering software may weigh towards a multi-user system classification, but is not likely to be a sole determining factor.

Additionally, characteristics associated with non-multi-user systems may be evaluated and used in calculating the multi-user system confidence score and/or a separate non-multi-user system confidence score. Some examples of these non-multi-user system characteristics have been discussed above in connection with examples of multi-user system characteristics. Non-limiting examples of such non-multi-user system characteristics may include: whether the users are identified as having the same billing address, whether the client 106 is associated with few different users, whether a particular user of the client 106 has at least a threshold recurrence of network site logins or accesses over a period of time, whether the software of the client 106 is currently popular and up-to-date, whether the shipping address of orders and the location of the client 106 frequently coincide, and so on.

Although the present disclosure provides automated multi-user system detection, manual inputs may be considered as well. A user input component in a user interface may ask a question: "Is this a kiosk?" accompanied with a checkbox. If a user selects the checkbox, it may be determined that the client 106 is a multi-user system. In one embodiment, an explicit user designation of a client 106 as being a multi-user system or being a non-multi-user system may override any other factor employed in automated multi-user system detection. However, if the user does not select the checkbox, it may be that the client 106 is a kiosk but the user overlooked or misunderstood the question. Accordingly, other characteristics as discussed above may be evaluated by the multi-user system detection application 115 to generate a classification.

The confidence scores may be generated in a variety of ways in various embodiments. In one embodiment, the confidence score corresponds to a weighted sum of values associated with characteristic evaluations. In other embodiments, a logistic regression prediction model, a random forest or other machine learning model, a scalar vector machine, and/or other approaches may be used in making a classification determination. In some cases, specific ranges of confidence scores may be used to enable or disable network site functionality.

Figure 2A:
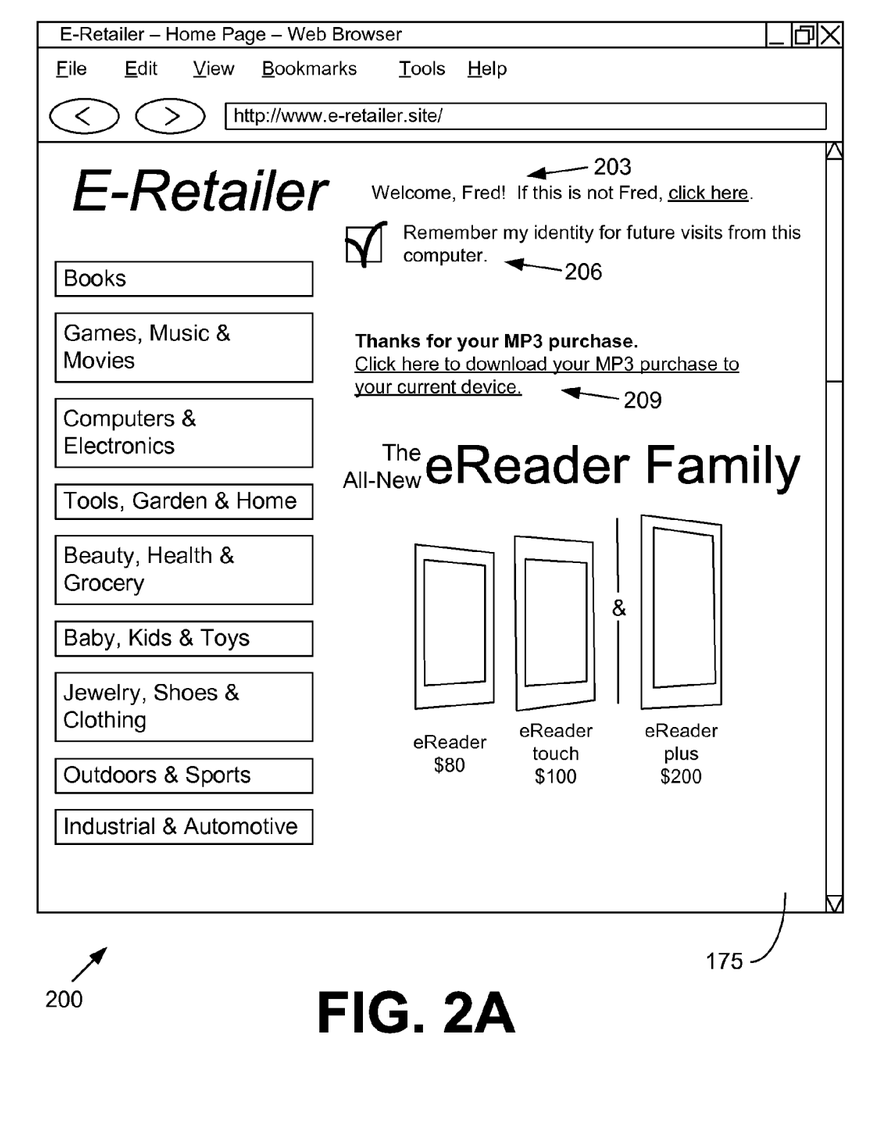
FIGS. 2A and 2B are drawings of examples of user interfaces rendered by a client in the networked environment of FIG. 1 according to various embodiments of the present disclosure.

Turning now to FIG. 2A, shown is one example of a user interface 200 rendered by a browser 172 (FIG. 1) executed in a client 106 (FIG. 1) in the networked environment 100 (FIG. 1). The user interface 200 depicts a network page 175 (FIG. 1) for a network site of an online retailer. In this example, the network page 175 includes an identification indication 203 that indicates that the user has been identified from an identifier present in the network resource request 127 (FIG. 1) for the network page 175.

Additionally, a remember feature 206 includes a user interface component (here, a checkbox) which allows the user to specify that the identity of the user is to be "remembered" for future visits from the particular client 106. In other words, a persistent cookie 133 (FIG. 1) may be set and associated with the particular user. However, while this may not be a problem for single-user systems, this may be a security and privacy risk for multi-user systems.

The network page 175 also includes a download feature 209 relating to a recently purchased music file. The download feature 209 indicates that the music file may be downloaded to the current client 106. Again, if the client 106 is a multi-user system, it may be undesirable to download the music file to the client 106.

Figure 2B:
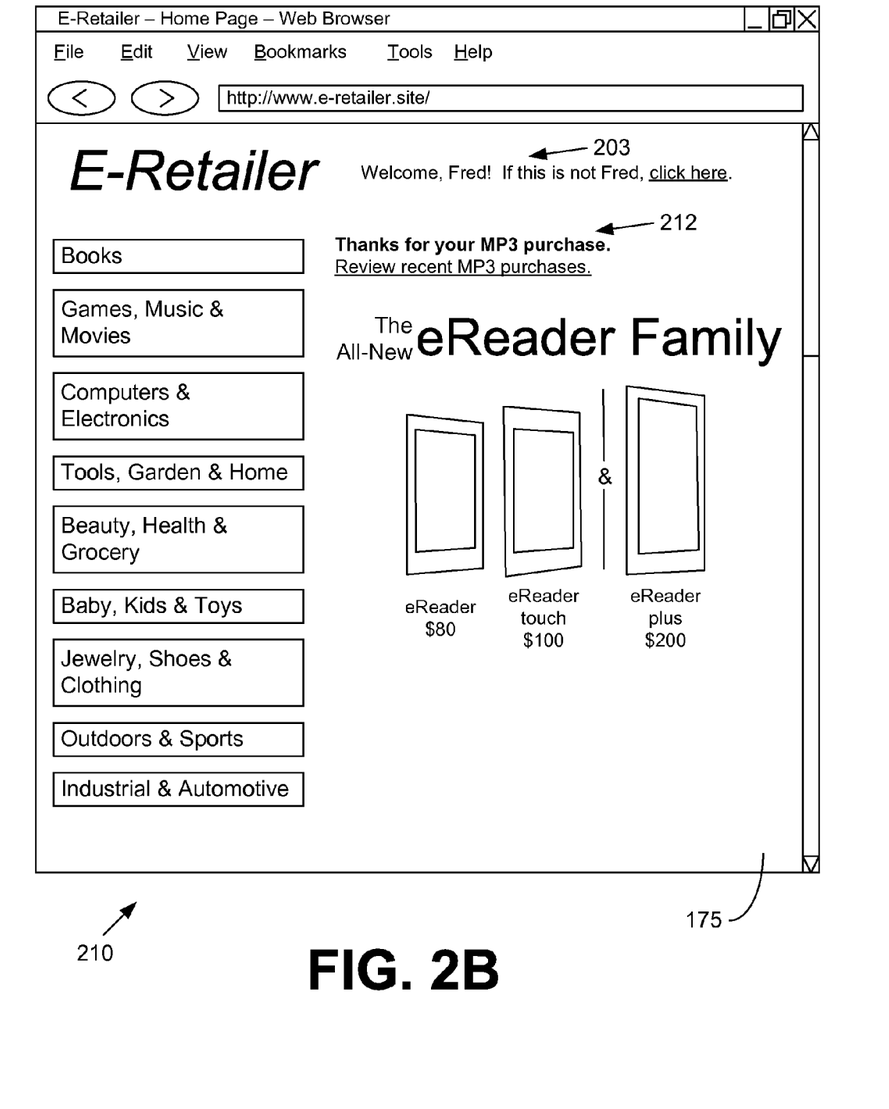

Moving on to FIG. 2B, shown is one example of a user interface 210 rendered by a browser 172 (FIG. 1) executed in a client 106 (FIG. 1) in the networked environment 100 (FIG. 1). Like FIG. 2A, user interface 210 also depicts a network page 175 (FIG. 1) for the network site of the online retailer. In contrast to FIG. 2A, the client 106 has been classified as a multi-user system. In this example, the network resource generation application 121 (FIG. 1) customized the network page 175 so that the remember feature 206 and download feature 209 have been omitted. The identification indication 203 remains because a user has been identified, e.g., through an express login.

The remember feature 206 has been omitted to disable such persistent login functionality for multi-user systems. The download feature 209 has been omitted to disable music file downloads to multi-user systems. The download feature 209 has been replaced with a purchase review feature 212 that facilitates review of recent music file purchases. Although features have been omitted from the network page 175 of FIG. 2B, it is understood that features may be added in other network pages 175 generated for multi-user systems.

Figure 3A:
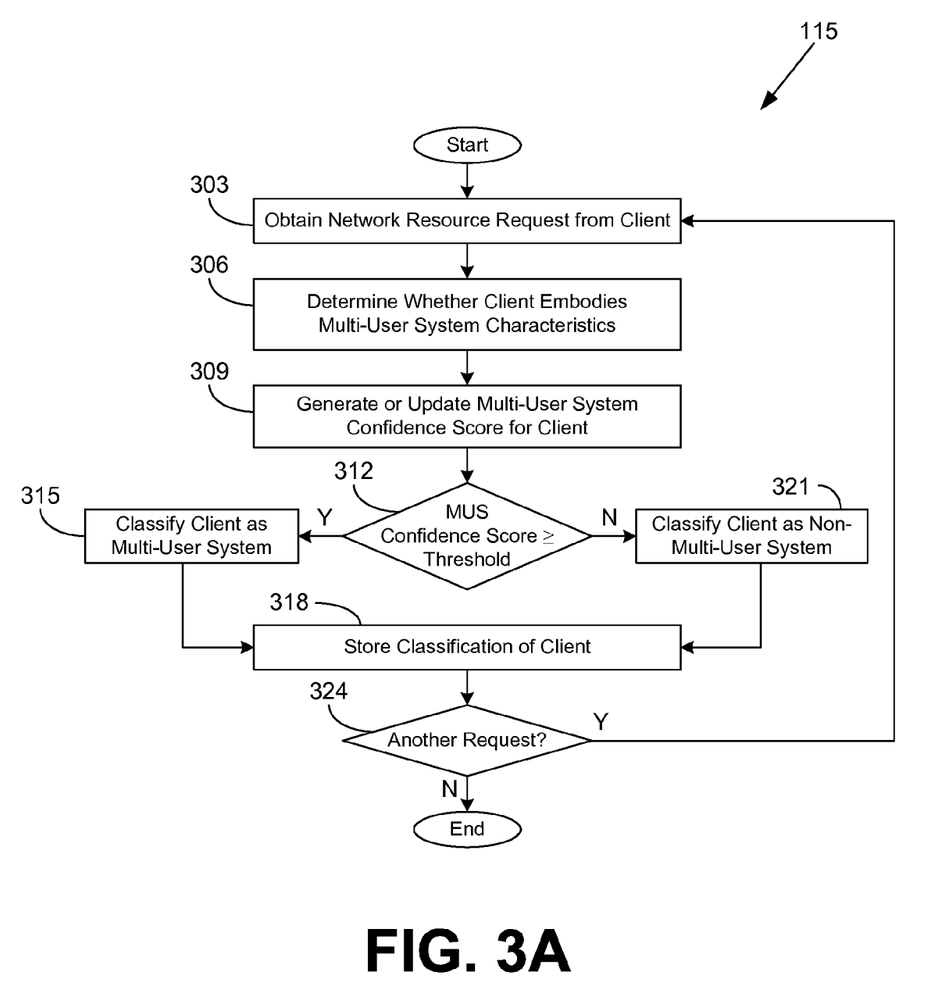
FIGS. 3A and 3B are flowcharts illustrating examples of functionality implemented as portions of a multi-user system detection application executed in a computing device in the networked environment of FIG. 1 according to various embodiments of the present disclosure.

Referring next to FIG. 3A, shown is a flowchart that provides one example of the operation of a portion of the multi-user system detection application 115 according to various embodiments. It is understood that the flowchart of FIG. 3A provides merely an example of the many different types of functional arrangements that may be employed to implement the operation of the portion of the multi-user system detection application 115 as described herein. As an alternative, the flowchart of FIG. 3A may be viewed as depicting an example of steps of a method implemented in the computing device 103 (FIG. 1) according to one or more embodiments.

Beginning with box 303, the multi-user system detection application 115 obtains a network resource request 127 (FIG. 1) from a client 106 (FIG. 1) over the network 109 (FIG. 1). In some cases, the network resource request 127 may be obtained by the network resource server application 118 (FIG. 1) and stored in the data store 112 (FIG. 1) in the network resource request history 145 (FIG. 1) or otherwise transferred to the multi-user system detection application 115. In box 306, the multi-user system detection application 115 determines whether the client 106 embodies multi-user system characteristics. To this end, the multi-user system detection application 115 evaluates the network resource request 127, the network resource request history 145, and/or other data for multi-user system characteristics. In some cases, the multi-user system detection application 115 may probe the client 106 or otherwise determine other detectable characteristics of the client 106.

In box 309, the multi-user system detection application 115 generates or updates a multi-user system confidence score for the client 106 based at least in part on the result of box 306 and potentially on parameters in the multi-user system classification configuration data 163 (FIG. 1). In box 312, the multi-user system detection application 115 determines whether the multi-user system confidence score meets a threshold for classification. If the score meets the threshold, the multi-user system detection application 115 classifies the client 106 as a multi-user system in box 315. The multi-user system detection application 115 then proceeds to box 318. If the score does not meet the threshold, the multi-user system detection application 115 classifies the client 106 as a non-multi-user system in box 321. The multi-user system detection application 115 then proceeds from box 321 to box 318.

In box 318, the multi-user system detection application 115 stores the classification of the client 106, as identified by a browser 172 (FIG. 1) or other identifier, in the multi-user system classifications 160 (FIG. 1). In another embodiment, the classification may be stored in the client 106 as a machine cookie, Flash cookie, or other cookie. In box 324, the multi-user system detection application 115 determines whether another network resource request 127 is to be received and processed. If another network resource request 127 is received and is to be processed, the multi-user system detection application 115 returns to box 303 and obtains the next network resource request 127. If another network resource request 127 is not to be processed, the portion of the multi-user system detection application 115 then ends.

Figure 3B:
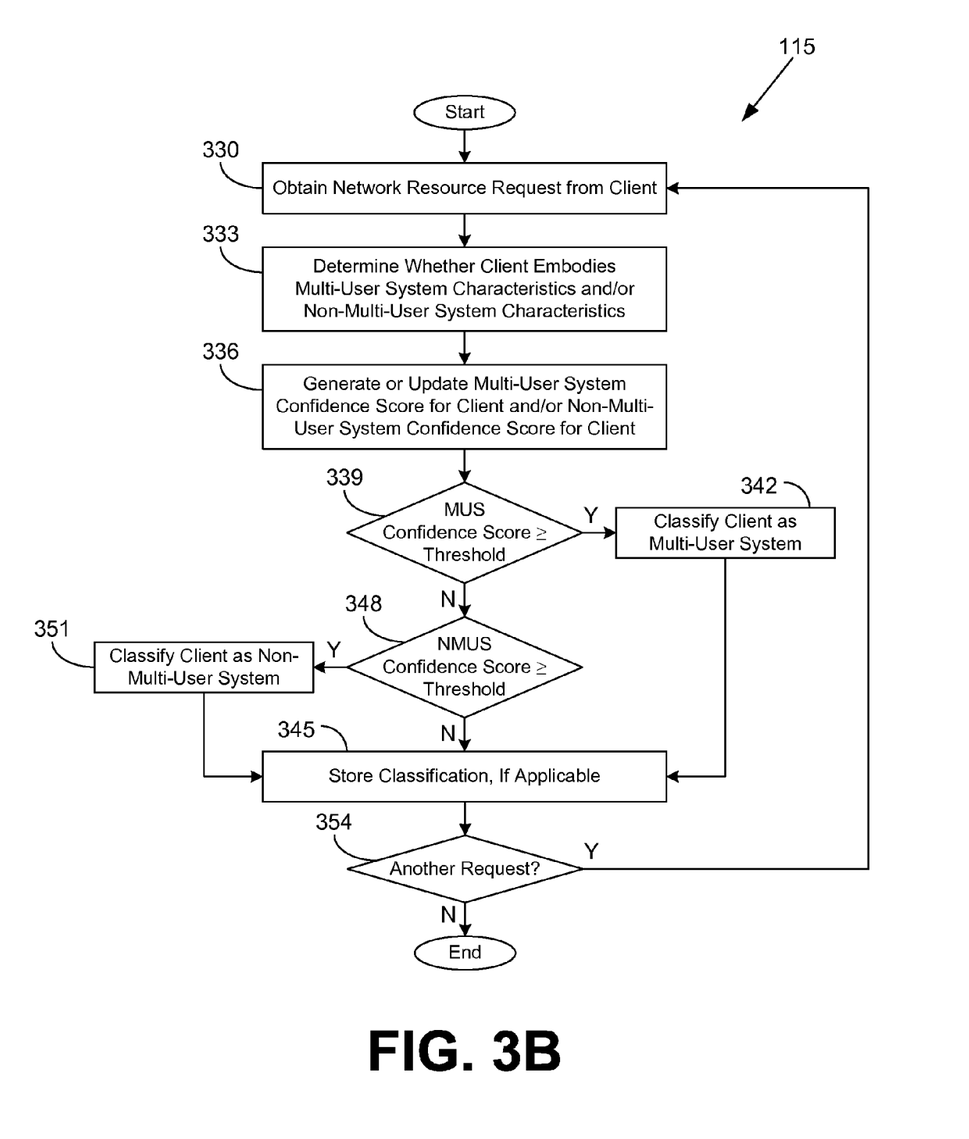

Turning now to FIG. 3B, shown is a flowchart that provides another example of the operation of a portion of the multi-user system detection application 115 according to various embodiments. It is understood that the flowchart of FIG. 3B provides merely an example of the many different types of functional arrangements that may be employed to implement the operation of the portion of the multi-user system detection application 115 as described herein. As an alternative, the flowchart of FIG. 3B may be viewed as depicting an example of steps of a method implemented in the computing device 103 (FIG. 1) according to one or more embodiments.

Beginning with box 330, the multi-user system detection application 115 obtains a network resource request 127 (FIG. 1) from a client 106 (FIG. 1) over the network 109 (FIG. 1). In some cases, the network resource request 127 may be obtained by the network resource server application 118 (FIG. 1) and stored in the data store 112 (FIG. 1) in the network resource request history 145 (FIG. 1) or otherwise transferred to the multi-user system detection application 115. In box 333, the multi-user system detection application 115 determines whether the client 106 embodies multi-user system characteristics and/or non-multi-user system characteristics. To this end, the multi-user system detection application 115 may evaluate the network resource request 127, the network resource request history 145, and/or other data for multi-user system characteristics and non-multi-user system characteristics. In some cases, the multi-user system detection application 115 may probe the client 106 or otherwise determine other detectable characteristics of the client 106.

In box 336, the multi-user system detection application 115 generates or updates a multi-user system confidence score and a non-multi-user system confidence score for the client 106 based at least in part on the result of box 306 and potentially on parameters in the multi-user system classification configuration data 163 (FIG. 1). In box 339, the multi-user system detection application 115 determines whether the multi-user system confidence score meets a threshold for classification. If the score meets the threshold, the multi-user system detection application 115 classifies the client 106 as a multi-user system in box 342. The multi-user system detection application 115 then proceeds to box 345.

If the multi-user system confidence score does not meet the threshold, the multi-user system detection application 115 moves from box 339 to box 348 and determines whether the non-multi-user system confidence score meets a threshold. If the non-multi-user system confidence score meets the threshold, the multi-user system detection application 115 classifies the client 106 as a non-multi-user system in box 351. Although FIG. 3B describes multiple confidence scores (i.e., a multi-user system confidence score and a non-multi-user system confidence score), it is understood that different thresholds may be applied to a single confidence score to arrive at a multi-user system or non-multi-user system designation. The multi-user system detection application 115 then proceeds from box 351 to box 345. If the non-multi-user system confidence score does not meet the threshold in box 348, a default classification may be used, and the multi-user system detection application 115 proceeds to box 345.

In box 345, the multi-user system detection application 115 stores the classification of the client 106, as identified by a browser 172 (FIG. 1) identifier or other identifier, in the multi-user system classifications 160 (FIG. 1). In another embodiment, the classification of the client 106 may be stored as a machine cookie, Flash cookie, or other persistent cookie in the client 106. In box 354, the multi-user system detection application 115 determines whether another network resource request 127 is to be received and processed. If another network resource request 127 is received and is to be processed, the multi-user system detection application 115 returns to box 330 and obtains the next network resource request 127. If another network resource request 127 is not to be processed, the portion of the multi-user system detection application 115 then ends.

Figure 4:
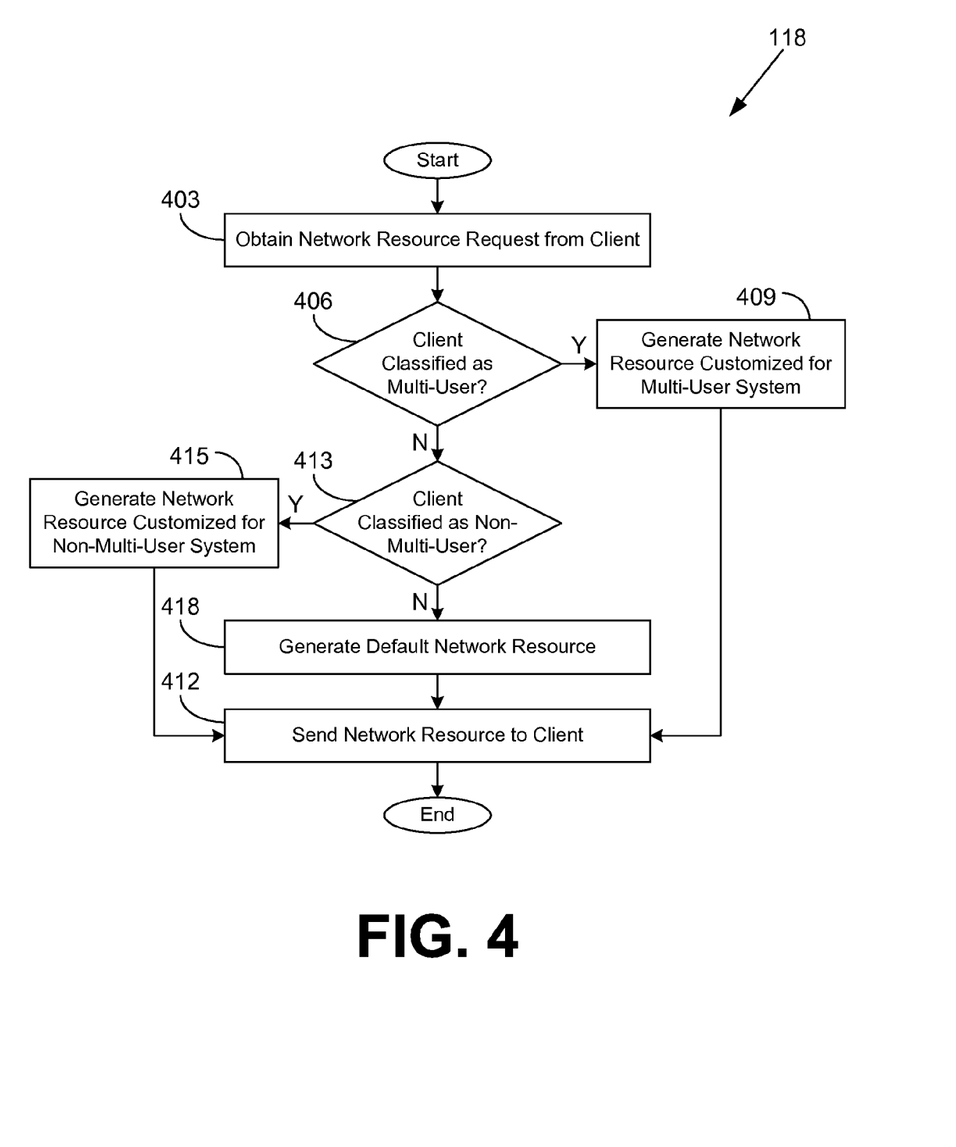
FIG. 4 is a flowchart illustrating one example of functionality implemented as portions of a network page server application executed in a computing device in the networked environment of FIG. 1 according to various embodiments of the present disclosure.

Moving on to FIG. 4, shown is a flowchart that provides one example of the operation of a portion of the network resource server application 118 according to various embodiments. It is understood that the flowchart of FIG. 4 provides merely an example of the many different types of functional arrangements that may be employed to implement the operation of the portion of the network resource server application 118 as described herein. As an alternative, the flowchart of FIG. 4 may be viewed as depicting an example of steps of a method implemented in the computing device 103 (FIG. 1) according to one or more embodiments.

Beginning with box 403, the network resource server application 118 obtains a network resource request 127 (FIG. 1) from a client 106 (FIG. 1) by way of the network 109 (FIG. 1). In box 406, the network resource server application 118 determines whether the client 106 (as identified through a browser 172 (FIG. 1) identifier) is classified as a multi-user system in the multi-user system classifications 160 (FIG. 1). In one embodiment, the classification may be stored by the client 106 and retrieved from the client 106 by the network resource server application 118. If the client 106 is classified as a multi-user system, the network resource server application 118 generates a network resource 124 (FIG. 1) in box 409 that is customized for multi-user systems. The generation and/or determination may be performed by the network resource generation application 121 (FIG. 1) in some embodiments. The network resource server application 118 then proceeds to box 412.

If the network resource server application 118 instead determines that the client 106 is not classified as a multi-user system, the network resource server application 118 moves from box 406 to box 413 and determines whether the client 106 is classified as a non-multi-user system. If the client 106 is classified as a non-multi-user system, the network resource server application 118 moves to box 415 and generates a network resource 124 that is customized for non-multi-user systems. The generation and/or determination may be performed by the network resource generation application 121 in some embodiments. The network resource server application 118 then proceeds to box 412.

If the network resource server application 118 instead determines that the client 106 is not classified as a non-multi-user system, the network resource server application moves from box 413 to box 418 and generates a default network resource 124. In some embodiments, the non-multi-user system classification may be a default classification. The network resource server application 118 then proceeds from box 418 to box 412. In box 412, the network resource server application 118 sends the generated network resource 124 to the client 106 by way of the network 109. Thereafter, the portion of the network resource server application 118 ends.

Figure 5:
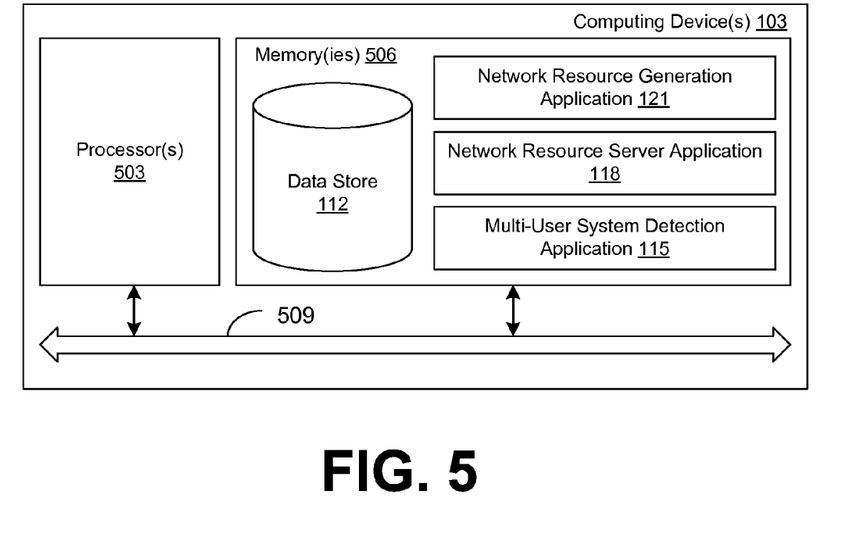
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the multi-user system detection application 115, the network resource server application 118, the network resource generation application 121, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the multi-user system detection application 115, the network resource server application 118, the network resource generation application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3A, 3B, and 4 show the functionality and operation of an implementation of portions of the multi-user system detection application 115 and the network resource server application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3A, 3B, and 4 show a specific order of execution, it is understood that the order of execution may differ from that which is depicted. For example, the order of execution of two or more blocks may be scrambled relative to the order shown. Also, two or more blocks shown in succession in FIGS. 3A, 3B, and 4 may be executed concurrently or with partial concurrence. Further, in some embodiments, one or more of the blocks shown in FIGS. 3A, 3B, and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the multi-user system detection application 115, the network resource server application 118, and the network resource generation application 121, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, wherein when executed the program causes the computing device to at least:
- determine whether a plurality of hypertext transfer protocol (HTTP) requests received from a client computing device embody a plurality of first characteristics associated with public multi-user systems used by different users and a plurality of second characteristics associated with non-multi-user systems, wherein one of the plurality of characteristics associated with public multi-user systems used by different users is an indicator in at least one of the plurality of HTTP requests that designates the client computing device as a particular type of multi-user computing device, and the indicator corresponds to a user-agent string that is customized by a supplier of the multi-user computing device;
- generate a confidence score based at least in part on the plurality of first characteristics and the plurality of second characteristics;
- determine whether the client computing device is a public multi-user system used by different users based at least in part on the confidence score;
- generate a network resource in response to receiving another HTTP request from the client computing device, the network resource being customized based at least in part on whether the client computing device is determined to be a public multi-user system used by different users; and
- send the network resource to the client computing device.

2. The non-transitory computer-readable medium of claim 1, wherein at least some of the plurality of first characteristics and the plurality of second characteristics are associated with different weights, and the confidence score is generated based at least in part on the different weights.

3. The non-transitory computer-readable medium of claim 1, wherein the network resource corresponds to a network page that is customized to omit at least one feature in response to determining that the client computing device is the public multi-user system used by different users.

4. A system, comprising:
- at least one computing device; and
- a public multi-user system detection application executable in the at least one computing device, wherein when executed the public multi-user system detection application causes the at least one computing device to at least:
  - generate a public multi-user system confidence score based at least in part on whether at least one network resource request received from a client computing device embodies a plurality of characteristics associated with public multi-user systems used by different users, wherein one of the plurality of characteristics associated with public multi-user systems used by different users is an indicator in the at least one network resource request that designates the client computing device as a particular type of multi-user computing device, and the indicator corresponds to a user-agent string that is customized by a supplier of the multi-user computing device; and
  - classify the client computing device as a public multi-user computing device used by different users in response to determining that the public multi-user system confidence score meets a public multi-user-system classification threshold.

5. The system of claim 4, wherein when executed the public multi-user system detection application further causes the at least one computing device to at least:
- generate a non-multi-user system confidence score based at least in part on whether the at least one network resource request embodies at least one of a plurality of characteristics associated with non-multi-user systems; and
- classify the client computing device as a non-multi-user system in response to determining that the non-multi-user system confidence score meets a non-multi-user-system classification threshold.

6. The system of claim 4, wherein another one of the plurality of characteristics associated with public multi-user systems used by different users is another indicator in the at least one network resource request that indicates that the client computing device executes a particular version of a software application.

7. The system of claim 4, wherein another one of the plurality of characteristics associated with public multi-user systems used by different users is a particular browser configuration.

8. The system of claim 4, wherein when executed the public multi-user system detection application further causes the at least one computing device to at least:
- determine whether the client computing device employs a content filter; and
- wherein the public multi-user system confidence score is based at least in part on whether the client computing device employs the content filter.

9. The system of claim 4, wherein another one of the plurality of characteristics associated with public multi-user systems used by different users is a source network address in a network address range that is associated with a network access provider for public multi-user systems.

10. The system of claim 4, wherein another one of the plurality of characteristics associated with public multi-user systems used by different users is a static source network address associated with the at least one network resource request.

11. The system of claim 4, wherein the at least one network resource request comprises a plurality of network resource requests, a plurality of users are associated with the plurality of network resource requests, and another one of the plurality of characteristics associated with public multi-user systems used by different users is an infrequency of use of a location associated with the client computing device as a shipping address by the plurality of users.

12. The system of claim 11, wherein the location is determined based at least in part on a respective source network address associated with individual ones of the plurality of network resource requests.

13. The system of claim 4, wherein the at least one network resource request corresponds to a plurality of network resource requests including one browser identifier and a plurality of user identifiers, and another one of the plurality of characteristics relates to a quantity of the plurality of user identifiers.

14. The system of claim 4, wherein the at least one network resource request corresponds to a plurality of network resource requests including one browser identifier and a plurality of user identifiers, and another one of the plurality of characteristics relates to a frequency of repeat user sessions corresponding to the plurality of user identifiers.

15. A method, comprising:
- receiving, via at least one of one or more computing devices, a plurality of network resource requests from a client computing device;
- determining, via at least one of the one or more computing devices, whether the client computing device is a public multi-user system used by different users based at least in part on whether the plurality of network resource requests embody a plurality of characteristics associated with public multi-user systems used by different users, wherein one of the plurality of characteristics associated with public multi-user systems used by different users is an indicator in at least one of the plurality of network resource requests that designates the client computing device as a particular type of multi-user computing device, and the indicator corresponds to a user-agent string that is customized by a supplier of the multi-user computing device; and
- initiating, via at least one of the one or more computing devices, storing of a result of determining whether the client computing device is a public multi-user system used by different users.

16. The method of claim 15, wherein determining, via at least one of the one or more computing devices, whether the client computing device is a public multi-user system used by different users further comprises determining, via at least one of the one or more computing devices, whether the client computing device is a non-multi-user system based at least in part on whether the plurality of network resource requests embody a plurality of characteristics associated with non-multi-user systems.

17. The method of claim 15, wherein determining, via at least one of the one or more computing devices, whether the client computing device is a public multi-user system further comprises determining, via at least one of the one or more computing devices, whether the client computing device is a public multi-user system used by different users based at least in part on whether the client computing device embodies a detectable characteristic of a public multi-user system used by different users.

18. The method of claim 15, wherein at least some of the plurality of characteristics are weighted differently in determining whether the client computing device is a public multi-user system used by different users.

19. The method of claim 15, wherein the result of determining whether the client computing device is a public multi-user system used by different users is stored in the client computing device in response to the initiating.

20. The method of claim 15, wherein another one of the plurality of characteristics associated with public multi-user systems used by different users is another indicator in at least one of the plurality of network resource requests that indicates that the client computing device executes a particular version of a software application.

21. The method of claim 15, wherein another one of the plurality of characteristics associated with public multi-user systems used by different users is a particular browser configuration.

22. The method of claim 15, wherein another one of the plurality of characteristics associated with public multi-user systems used by different users is whether the client computing device employs a content filter.

23. A system, comprising:
- at least one computing device; and
- a non-multi-user system detection application executable in the at least one computing device, wherein when executed the non-multi-user system detection application causes the at least one computing device to at least:
  - generate a non-multi-user system confidence score based at least in part on whether at least one network resource request received from a client computing device embodies a plurality of characteristics associated with non-public non-multi-user systems that are not used by different users, wherein one of the plurality of characteristics associated with non-public non-multi-user systems is a lack of an indicator in the at least one network resource request that designates the client computing device as a particular type of public multi-user computing device, and the indicator corresponds to a user-agent string that is customized by a supplier of the public multi-user computing device; and
  - classify the client computing device as a non-multi-user computing device in response to determining that the non-multi-user system confidence score meets a non-multi-user-system classification threshold.

24. The system of claim 23, wherein another one of the plurality of characteristics associated with non-public non-multi-user systems is an indicator in the at least one network resource request that indicates that the client computing device executes a particular version of a software application.

25. The system of claim 23, wherein another one of the plurality of characteristics associated with non-public non-multi-user systems is a use of a location associated with the client computing device as a shipping address by a user associated with the at least one network resource request.

26. The system of claim 23, wherein the at least one network resource request corresponds to a plurality of network resource requests including one browser identifier and at least one user identifier, and another one of the plurality of characteristics relates to a quantity of the at least one user identifier.

27. The system of claim 23, wherein the at least one network resource request corresponds to a plurality of network resource requests including one browser identifier and at least one user identifier, and another one of the plurality of characteristics relates to a frequency of repeat user sessions corresponding to the at least one user identifier.

* * * * *